(12) United States Patent
Schlesser et al.

(10) Patent No.: US 7,051,501 B2
(45) Date of Patent: May 30, 2006

(54) AGRICULTURAL BI-MOWER WITH CANTILEVER BEAM SUSPENSION

(75) Inventors: Walter Mark Schlesser, Ottumwa, IA (US); Timothy J. Kraus, Hedrick, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/958,939

(22) Filed: Oct. 5, 2004

(65) Prior Publication Data
US 2005/0044831 A1 Mar. 3, 2005

Related U.S. Application Data

(62) Division of application No. 10/154,044, filed on May 23, 2002, now Pat. No. 6,837,033.

(51) Int. Cl.
A01D 34/24 (2006.01)
A01D 34/42 (2006.01)
A01D 34/63 (2006.01)

(52) U.S. Cl. .................................................... 56/15.2

(58) Field of Classification Search ............... 56/14.9, 56/15.3, 16.5, 15.2, 10.4, 15.7, 6, 13.6, 13.7, 56/15.5, 192, 255, 295, 16.2
See application file for complete search history.

(56) References Cited

U.S. PATENT DOCUMENTS

| | | | | |
|---|---|---|---|---|
| 3,526,083 A | * | 9/1970 | Barry et al. | 56/10.7 |
| 3,791,115 A | * | 2/1974 | Nelsen et al. | 56/15.2 |
| 4,135,349 A | * | 1/1979 | Schwertner | 56/6 |
| 4,183,195 A | * | 1/1980 | James | 56/11.9 |
| 4,370,846 A | * | 2/1983 | Arnold | 56/6 |
| 4,432,192 A | | 2/1984 | Maier et al. | 56/15.3 |
| 4,697,404 A | * | 10/1987 | Brockmeier et al. | 56/6 |
| 4,723,396 A | | 2/1988 | Emacora | 56/13.6 |
| 4,974,399 A | * | 12/1990 | Haberkorn | 56/6 |
| 5,069,022 A | * | 12/1991 | Vandermark | 141/1 |
| 5,133,174 A | * | 7/1992 | Parsons, Jr. | 62/292 |
| 5,353,580 A | | 10/1994 | Wolff | 56/15.2 |
| 5,566,537 A | | 10/1996 | Kieffer et al. | 56/15.2 |
| 5,727,371 A | | 3/1998 | Kieffer et al. | 56/6 |
| 5,983,615 A | * | 11/1999 | Schmid et al. | 56/208 |
| 6,302,220 B1 | * | 10/2001 | Mayerle et al. | 172/459 |
| 6,349,529 B1 | | 2/2002 | Neuerburg et al. | 56/14.9 |
| 6,758,031 B1 | * | 7/2004 | Franet et al. | 56/14.9 |

FOREIGN PATENT DOCUMENTS

| | | |
|---|---|---|
| DE | 15 82 350 | 7/1971 |
| EP | 0 514 314 | 11/1992 |
| EP | 0 756 813 | 2/1997 |
| EP | 0 882 386 | 12/1998 |
| FR | 1 094 356 | 12/1954 |
| WO | WO 95 01715 | 12/1995 |

* cited by examiner

*Primary Examiner*—Árpád Fábián Kovács

(57) ABSTRACT

A mower has a pair of cutter heads which are pivotally supported by respective cantilever beams. The cantilever beams are pivotally coupled with a hitch assembly, which in turn is coupled with a traction unit via two lower lift arms and a floatable top link. The floatable top link allows the hitch assembly to float relative to the traction unit during transport. A hydraulic cylinder interconnected between the cantilever beams pivots the beams between a transport position and a working position. Stops on the hitch assembly limit pivotal movement of the beams relative to the hitch assembly.

6 Claims, 5 Drawing Sheets

AGRICULTURAL BI-MOWER WITH CANTILEVER BEAM SUSPENSION

This application is a divisional of application Ser. No. 10/154,044, filed May 23, 2002, now U.S. Pat. No. 6,837,033, granted 4 Jan. 2005.

FIELD OF THE INVENTION

The present invention relates to agricultural mowers, and, more particularly, to agricultural mowers having multiple cutter heads.

DESCRIPTION OF THE RELATED ART

A mower-conditioner is used for cutting vegetative matter such as hay or the like. The mower includes a cutterbar which cuts the vegetative matter at a predetermined distance from the ground. The cutterbar may be in the form of a sickle cutterbar or a rotary disk cutterbar. In the case of a rotary disk cutterbar, a common platform carries a plurality of cutterbar modules, with each cutterbar module including a large oval disk with free swinging knives which cut the crop. The oval disks are driven with a gear train carried within the platform in a timed manner such that the working width of adjacent disks overlap but do not interfere with each other. An example of a mower-conditioner using a rotary disk cutterbar is the model No. 956 which is sold by the assignee of the present invention.

With a mower-conditioner as described above, a frame supports a single cutter head which carries the rotary disk cutterbar. A tongue extends from the frame and couples with a draw bar hitch at the rear of the traction unit such as an implement tractor. Wheels supported by the frame at the rear of the mower-conditioner are raised and lowered to adjust the height of the cutting platform.

With fewer and larger farms being the trend in the agricultural industry, the size of the equipment used to harvest the crops also tends to increase. However, with increased size of equipment comes heavier loads, difficulty in transport on typical width public roads, necessity for the equipment to adjust on more of a local basis to accommodate unevenness in ground contour, etc.

What is needed in the art is a mower-conditioner providing faster harvesting of crops, while at the same time being easy to transport and adjusting to variations in ground contour.

SUMMARY OF THE INVENTION

The present invention provides a mower with a pair of cutter heads which are supported by respective cantilever beams in a pivotal manner. The cantilever beams are pivotally coupled with a hitch assembly, which in turn is coupled with a traction unit via two lower lift arms and a length adjustable top link that can be selectively placed in fixed and float modes. During field operation, the top link is placed in a selected fixed length position for establishing a desired cutting angle of the cutting device carried by each of the cutter heads. The top link is placed in a float mode which allows the hitch assembly to float relative to the traction unit during transport. An adjustment arrangement is provided for pivoting the beams between a transport position and a working position. Stops on the hitch assembly limit pivotal movement of the beams relative to the hitch assembly.

The invention comprises, in one form thereof, a mower including a hitch assembly, a pair of cutter heads and a pair of cantilever beams. Each cutter head includes a cutterbar. Each beam is connected at one end with the hitch assembly for pivoting horizontally about an upright axis and is connected at an other end with a respective cutter head for establishing a horizontal axis about which the cutter head may pivot vertically.

The invention comprises, in another form thereof, a mower including a 3-point hitch assembly with two lower lift arms and a length-adjustable top link, which may selectively be fixed in a desired length or permitted to float. At least one cutter head is provided, with each cutter head including a cutterbar and at least one transport wheel. At least one cantilever beam is provided, with each beam connected at one end with the hitch assembly, and pivotally connected at an other end with a respective cutter head so as to permit the cutter head to pivot vertically.

The invention comprises, in yet another form thereof, an agricultural working unit including a hitch assembly, a pair of working heads, a pair of cantilever beams, and an adjustable linkage arrangement. Each beam is pivotally connected at one end with the hitch assembly and is connected at an other end with a respective working head. The adjustable linkage arrangement is coupled with each of the beams for pivoting each of the beams relative to the hitch assembly.

An advantage of the present invention is that each cutter head is suspended from and supported by a cantilever beam in a manner allowing the cutter heads to float relative to the ground contour.

Another advantage is that the cantilever beams are pivoted between a transport position and a working position using a single adjusting device, and more specifically using a powered adjusting device in the form of a hydraulic cylinder.

Yet another advantage is that a transport wheel is used to support the distal end of each cutter head during transport.

A further advantage is that the cutterbar of each cutter head is driven in a timed manner by a common gear box, powered in any desired manner, for example, through a powered telescopic shaft extending from the traction unit or by a hydraulic motor mounted adjacent the gear box, so that the proximal cutterbar modules may overlap without interfering with each other.

Still another advantage is that the cutter head deflects the swath away from the traction unit so that the wheels of the traction unit do not straddle a swath.

Still another advantage is that the swath forming shield of the cuter head may selectively be adjusted to either form a relatively wide swath for enhanced drying, or to form narrower swaths outward from the traction unit such that adjacent swaths from a same cutter head have a combined swath width which allows pick up in a single pass with a pick up head.

Another advantage is that the top link of the 3-point hitch attachment may be placed in a float mode or condition to allow the hitch assembly to float relative to the traction unit to accommodate uneven ground.

Yet another advantage is that mechanical stops are provided on the hitch and/or cantilever beams to limit pivotal movement of the beams relative to the hitch assembly.

Still another advantage is that, as viewed from the side, the frame member supporting the cantilever beams is arched upwardly and rearwardly from the lower forward ends adapted for connection to the lower links or arms of the traction unit three-point hitch, this shape: (a) exhibiting a uniform stress characteristic, (b) resulting in an efficient use of material, (c) affording good visibility, and (d) allowing the cutter heads to extend beneath them such that, in cooperation with the working position of the cantilever beams, the cutter heads are located closely adjacent to the traction unit support wheels so as to minimize stresses and improve floatation stability.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENT

Figure 1:
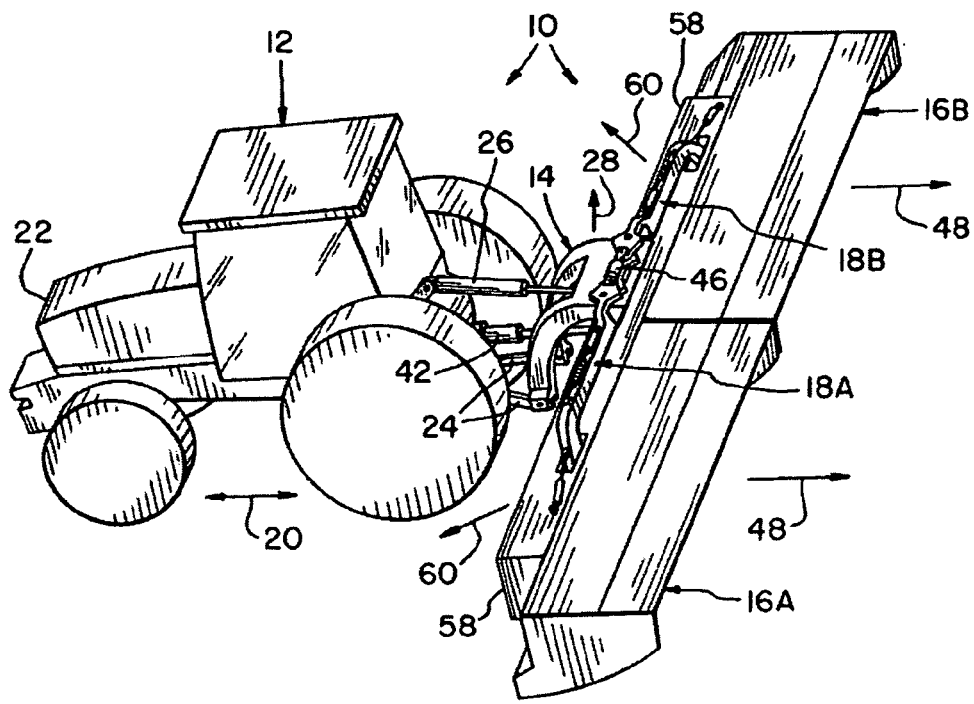
FIG. 1 is a perspective view of an embodiment of a mower of the present invention with the cutter head in a working position.
Figure 2:
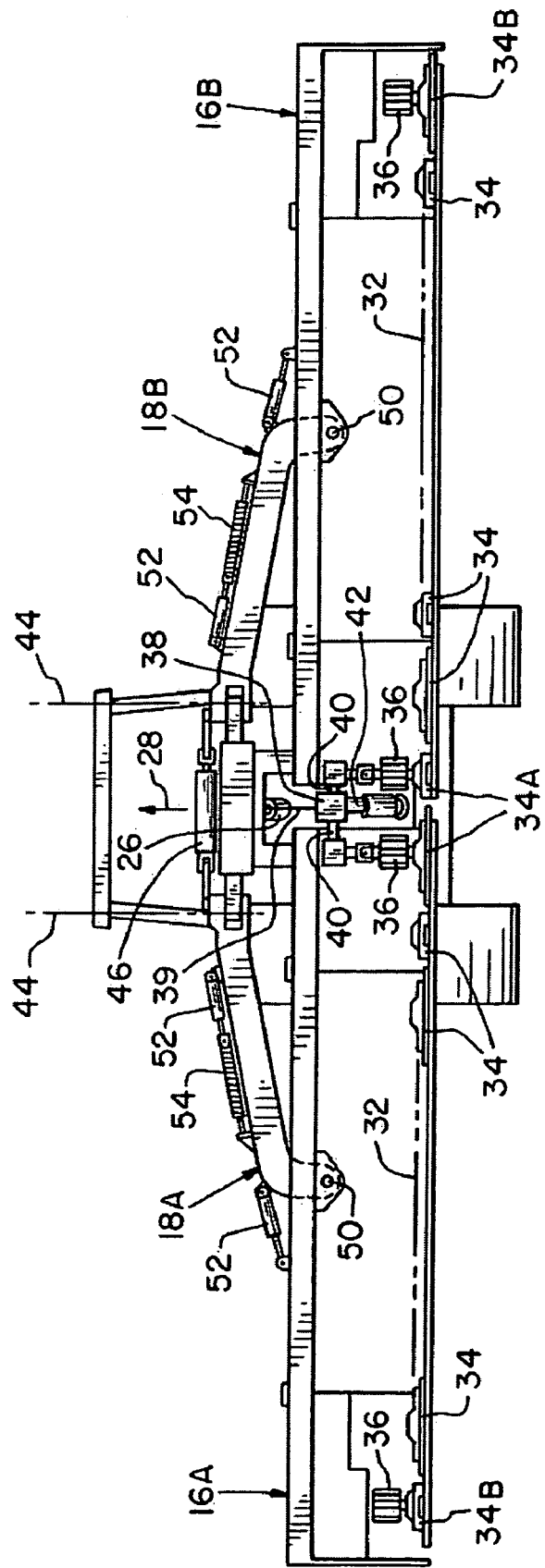
FIG. 2 is a front view of the mower of FIG. 1.
Figure 3:
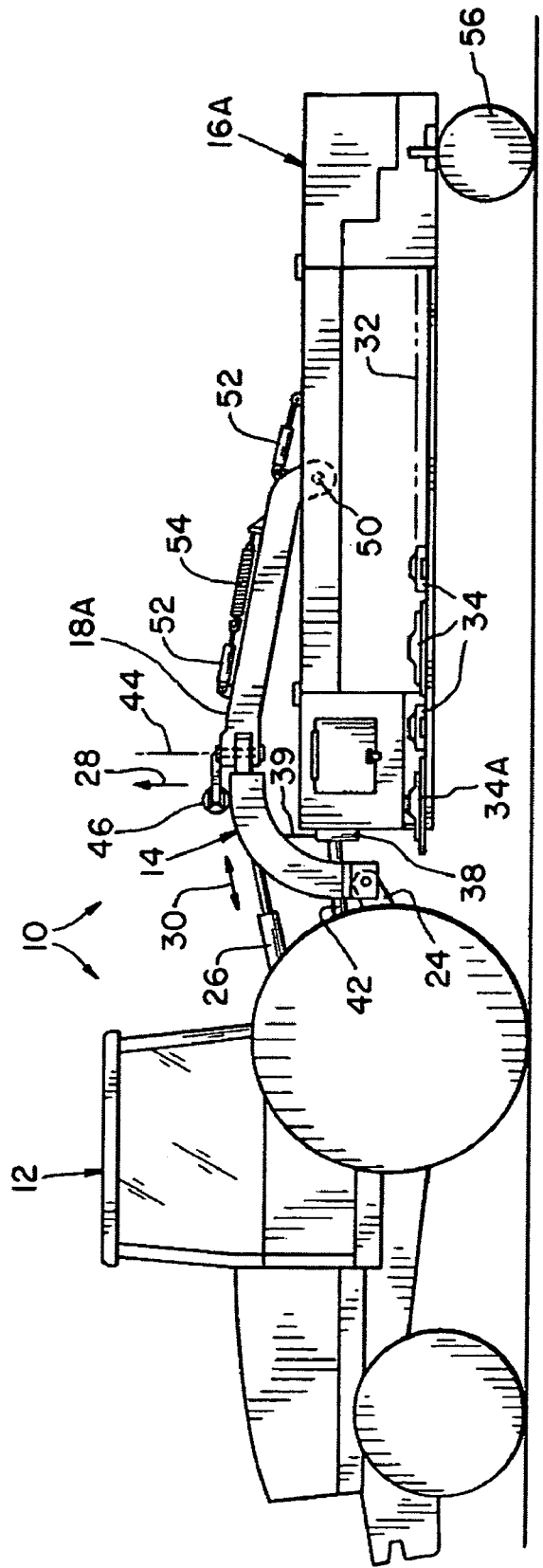
FIG. 3 is a side view of the mower of FIG. 1 with the cutter heads folded to the transport position.

Referring now to the drawings, and more particularly to FIGS. 1–3, there is shown an embodiment of an agricultural working unit 10 of the present invention, in the form of a mower. Mower 10 generally includes a traction unit 12, hitch assembly 14, pair of working heads 16A and 16B, and pair of cantilever beams 18A and 18B.

Traction unit 12 may be of any type suitable for a given application, and preferably in the embodiment shown, is in the form of a bi-directional traction unit, as indicated by double headed directional arrow 20. Configured as such, an operator may face in either direction with suitable seating, operating controls, etc. so that either longitudinal direction can be considered a "forward" direction.

Alternatively, traction unit 12 can be configured as a typical agricultural tractor with the forward end being adjacent hood 22 which houses an internal combustion engine. Configured as such, the front end of traction unit 12 may optionally be provided with a 3-point hitch attachment (not shown), such that hitch assembly 14 may be coupled with either the forward or the rearward end of traction unit 12.

Hitch assembly 14 is in the form of a 3-point hitch assembly which is coupled with traction unit 12 using two lower lift arms 24 and a top link 26. Lower lift arms 24 and top link 26 are typically thought of as being part of traction unit 12, thus allowing traction unit 12 to be detachably coupled with hitch assembly 14.

Lower lift arms 24 are preferably separate from each other and hydraulically operated from within traction unit 12 and raise and lower hitch assembly 14 in a lifting direction 28. Of course, it will be appreciated that lifting direction 28 has a somewhat curved profile as lift arms 24 pivot about the pivotal couplings with traction unit 12. For simplicity sakes, however, lifting direction 28 is assumed to be generally linear at least over a short lifting distance. In any event, the lifting mechanism will permit the lift arms 24 to float during operation and coupled between the traction unit 12 and the lift arms are respective hydraulic float cylinders (not shown) that are coupled to an accumulator (not shown) so as to provide a lifting action on the hitch assembly 14 to counterbalance the weight of the cutter heads 16A and 16B while providing lateral float. An example of one arrangement for controlling the lower lift arms 24 is disclosed in U.S. Pat. No. 5,983,615, granted 16 Nov. 1999, and assigned to the assignee of this application.

Figure 8:
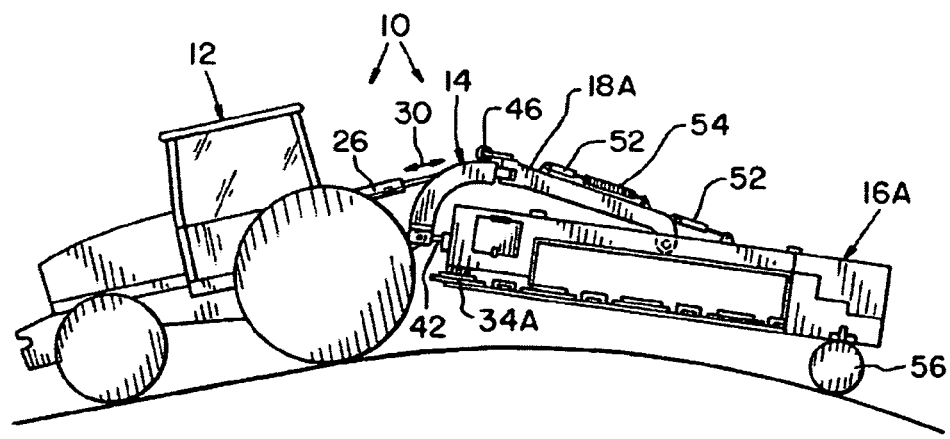
FIG. 8 is a side view of the mower shown in FIGS. 1–3 and 7, with the cutter heads folded to the transport position and traversing over uneven ground.

Top link 26 is an axially adjustable top link such as a hydraulic cylinder which may be actuated from within the cab of traction unit 12. Hydraulic cylinder 26 may be placed in a "float" position which opens the oil on opposite sides of the piston within hydraulic cylinder 26 to allow the hydraulic ram to float freely from a retracted to an extended position, as indicated by directional arrow 30 (FIGS. 3 and 8). This is accomplished by placing a hydraulic lever within the cab of traction unit 12 in a "float" position. Of course, when hydraulic cylinder 26 is not in the float position, the ram is fixed at an axial position selected by the user. The extension or retraction of the ram of hydraulic cylinder 26 adjusts the cutting orientation of cutter head 16A and 16B, as will be described in more detail hereinafter.

Working heads 16A and 16B are in the form of cutter heads in the embodiment shown for cutting vegetative matter such as hay or the like. Each cutter head 16A and 16B includes a cutterbar 32 for cutting the vegetative matter. Cutterbar 32 is in the form of a rotating disk cutterbar in the embodiment shown, but may also be in the form of a sickle cutterbar (not shown). Cutterbar 32 includes a plurality of cutterbar modules 34, each having a generally oblong shaped disk with a pair of knives respectively positioned at the longitudinal ends of the disk. Cutterbar modules 34 associated with each cutter head 16A and 16B are driven in a timed manner relative to each other (e.g., through a gear train carried within the platform under cutterbar modules 34) such that adjacent cutterbar modules rotate approximately 180° relative to each other so as not to interfere with operation of each other during use. A proximal cutterbar module 34A positioned closest to hitch assembly 14 and a distal cutterbar module 34B positioned furthest from hitch assembly 14 each carry a converging drum 36 thereabove for directing flow of the vegetative matter toward the center of each cutter head 16A and 16B, respectively.

Proximal cutterbar modules 34A receive input power from a common input power source and serially drive the remaining cutterbar modules 34. In particular, each proximal cutterbar module 34A is coupled with a gear box 38 via a respective telescoping power shaft 40. Gear box 38 is mounted to hitch assembly 14 (as indicated schematically by line 39 in FIGS. 2 and 3) and coupled with a power source on traction unit 12 via telescoping power take-off shaft 42, but may alternatively be coupled to an output shaft of a hydraulic motor (not shown) mounted adjacent the gear box and driven by a pump located on traction unit 12. Traction unit 12 thereby positively drives proximal cutterbar modules 34A in a timed manner relative to each other such that proximal cutterbar modules 34A overlap but do not interfere with each other during operation. This ensures that the vegetative matter is cut without any gaps or spaces extending from the distal end of one cutter head 16A to the distal end of the other cutter head 16B.

Each cutter head 16A and 16B may optionally include a conditioner for providing improved drying of the vegetative matter. The conditioner may be used to crimp and or remove waxy substances from the outer surfaces of the vegetative matter. The conditioner may be in the form of, e.g., an impeller, rubber rolls or steel rolls. It is common practice to provide such cutter heads with swath forming elements located so as to deflect the stream of crop material leaving the cutterbar so as to cause a selected varied width swath of crop to be laid down on the ground and to selectively shift the swath of crop outwardly from the working centerline of the cutter heads 16A and 16B when it is desired that adjacent swaths be of a sufficiently narrow combined width that they can be picked up together by the pick-up head of an ensilage harvester or baler, for example. Such conditioners are known, and are therefore not shown in the drawings or described in further detail herein for simplicity sake.

Cantilever beams 18A and 18B extend in a cantilever manner from hitch assembly 14. More particularly, each beam 18A and 18B includes a proximal end relative to hitch assembly 14 which is pivotally connected with hitch assembly 14 about a respective pivot axis 44 which extends generally parallel to lifting direction 28 (see, e.g., FIGS. 2 and 3).

Beams 18A and 18B are rotated relative to each other and to hitch assembly 14 using an adjustable linkage arrangement in the form of a hydraulic cylinder 46. The adjustable linkage arrangement 46 may be configured other than a hydraulic cylinder, depending upon the particular application, and in fact may include a separate adjusting device for each beam 18A and 18B. Extension of hydraulic cylinder 46 causes beams 18A and 18B (and thereby cutter heads 16A and 16B) to move to a transport position (FIGS. 3 and 7) in which cutter heads 16A and 16B, and the beams 18A and 18B, are generally parallel with each other. With the direction of forward travel of the traction unit 12 being reversed for transport, the beams 18A and 18B, and the heads 16A and 16B are in trailing relationship to the hitch assembly 14. Retraction of hydraulic cylinder 46 causes beams 18A and 18B to be moved to respective laterally extending positions (and thereby cutter head 16A and 16B) (FIGS. 1 and 2) in which cutter heads 16A and 16B are generally longitudinally aligned with each other.

Each beam 18A and 18B includes a distal end relative to hitch assembly 14 which is pivotally connected with a respective cutter head 16A or 16B. More particularly, each cutter head 16A and 16B defines a working direction 48 (FIG. 1) corresponding to the direction of movement of mower 10 during operation. Each cutter head 16A and 16B pivots about a pivot axis 50 at the distal end of each corresponding beam 18A and 18B, thereby allowing cutter heads 16A and 16B to float or adjust to the contour of the ground during operation. Each pivot axis 50 extends generally parallel with working direction 48. In the embodiment shown, each pivot axis 50 is positioned approximately midway between the proximal end and distal end of each corresponding cutter head 16A and 16B to assist in balancing the respective cutter head 16A or 16B.

To further assist in balancing cutter heads 16A and 16B, a hydraulic balancing arrangement including a pair of hydraulic cylinders 52 coupled in parallel with each other and a preload spring 54 apply a selected lifting force to the distal end of each cutter head 16A and 16B. The particular details of the hydraulic balancing arrangement are more fully described in another pending patent application which is also commonly assigned to the assignee of the present invention, and therefore will not be described in greater detail herein. Suffice it to say that the amount of preload applied to the upper hydraulic cylinder 52 using spring 54 adjusts the lifting force applied to the distal end of a respective cutter head 16A or 16B using the lower hydraulic cylinder 52.

Each cutter head 16A and 16B is also optionally configured with a transport wheel 56. Transport wheel 56 may be removable or retractable, and is aligned generally parallel with the running direction of traction unit 12 when cutter heads 16A and 16B are in the transport position (FIGS. 3 and 8). Transport wheel 56 functions to support the distal end of each cutter head 16A and 16B during transport and thereby partially remove load from beams 18A and 18B which may occur as a result of bouncing, etc, of cutter heads 16A and 16B during transport.

Cutter heads 16A and 16B each include a forming shield 58 which is configured, in a conventional manner, not shown in detail, for adjusting both swath width as well as swath location. Preferably, each forming shield 58 is configured to selectively deflect cut crop to form a wide swath beginning just outside the wheel track of the adjacent wheel of the traction unit 12 (wide swaths being preferred when more drying of the crop is desired), or to deflect the cut crop more toward the distal end of each respective cutter head 16A and 16B (i.e., away from and outside the track width of traction unit 12), as indicated by directional arrows 60 in FIG. 1, and in this way form a narrower swath of crop. In this manner, the wheels of traction unit 12 do not straddle a swath cut by cutter heads 16A or 16B. In the case where the swath from each cutter head 16A and 16B is discharged more closely adjacent the distal end thereof, it lies closely adjacent to the swath from the same cutter head when traction unit 12 is reversed at the end of a field and moved across the field in an opposite direction. For example, if traction unit 12 is moved in working direction 48 (FIG. 1) and then reversed in a clockwise direction at the end of the field and moved in a working direction opposite to that shown, the two swaths from cutter head 16A will lie closely adjacent to each other and away from traction unit 12. The width of the adjacent swaths from cutter head 16A are also preferably adjusted so that the combined width of the two swaths may be picked up by a single pickup head of a, forage chopper or the like.

Figure 4:
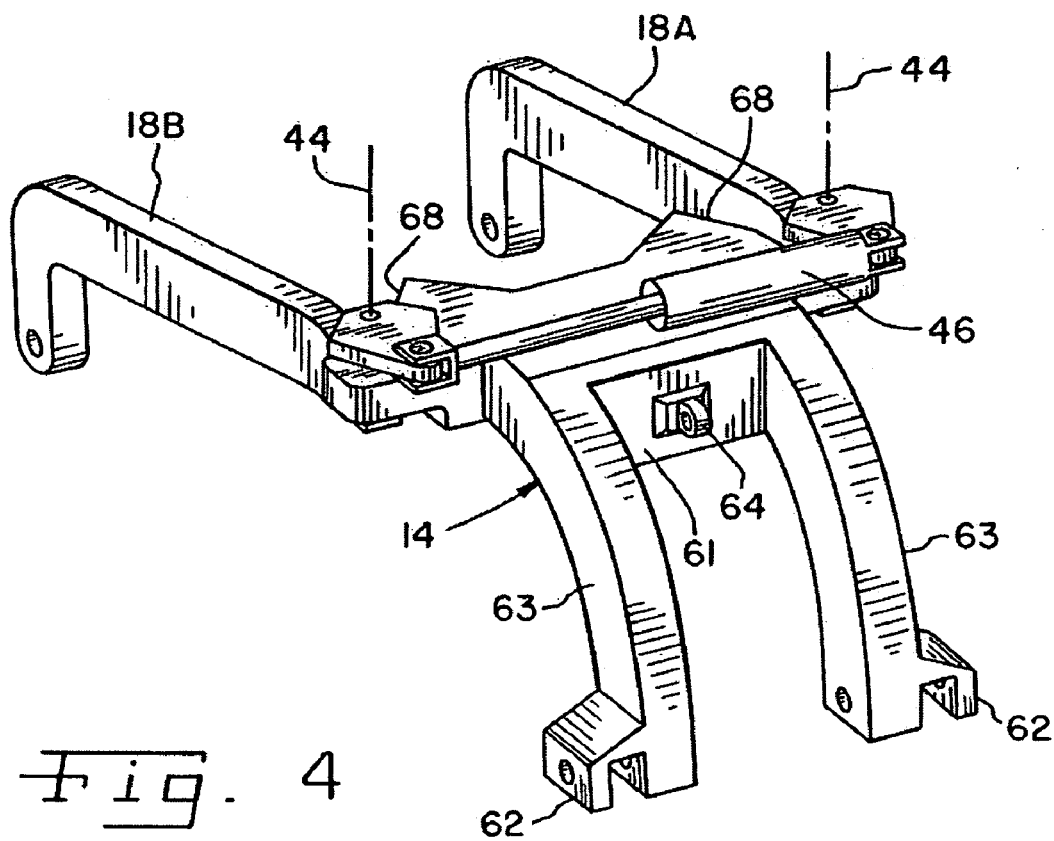
FIG. 4 is a perspective view illustrating the hitch assembly and cantilever beams.
Figure 5:
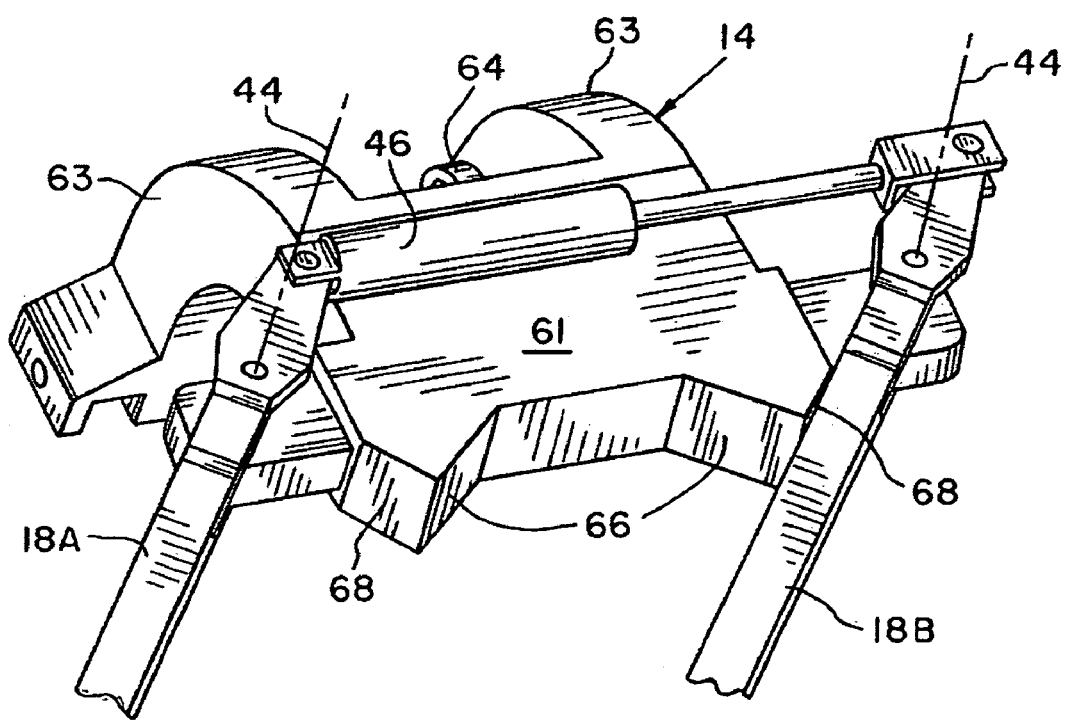
FIG. 5 is a fragmentary, perspective view of the hitch assembly and cantilever beams shown in FIG. 4.
Figure 6:
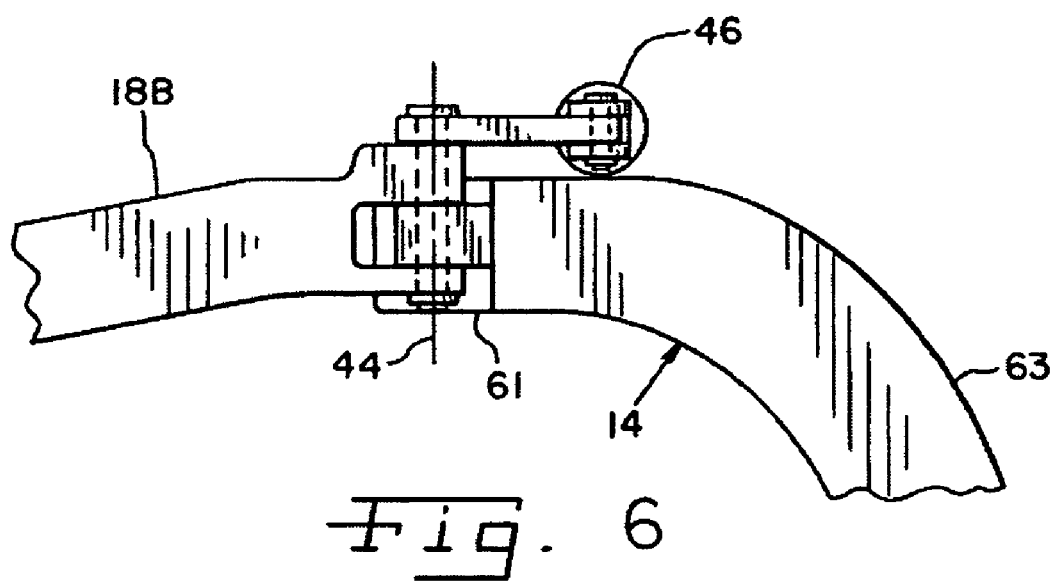
FIG. 6 is a fragmentary, side view of the hitch assembly and one of the cantilever beams shown in FIGS. 4 and 5.

Referring now to FIGS. 4–6, hitch assembly 14 and beams 18A and 18B will be described in greater detail. Hitch assembly 14 includes an arched frame defined by a top cross arm 61 and a pair of curved legs 63 extending downwardly and transversely away from top cross arm 61. Hitch assembly 14 includes a pair of lower couplings 62 which couple with lower lift arms 24; and an upper coupling 64 which couples with top link 26. Hydraulic cylinder 46 pivots beams 18A and 18B about respective pivot axes 44 at or near top cross arm 61 between a working position (shown in FIGS. 1 and 2) and a transport position (shown in FIGS. 3–5 and 7–8). Hydraulic cylinder 46 maintains beams 18A and 18B generally parallel to each other regardless of whether traction unit 12 is positioned either in line or offset from beams 18A and 18B, such as during a turning maneuver (see, e.g., FIG. 7).

Hitch assembly 14 includes a pair of stops 66 for limiting pivotal movement of beams 18A and 18B. Stops 66 are in the form of projections which extend from hitch assembly 14 with respective abutment surfaces 68 which define mechanical limits for limiting pivoting action of beams 18A and 18B. Abutment surfaces 68 are configured to lie generally parallel with a corresponding beam 18A or 18B when the beam 18A or 18B is at a predetermined position corresponding to the mechanical limit. Placing abutment surfaces 68 generally parallel to a respective beam 18A or 18B at the predetermined mechanical limit position allows a larger engagement area between stops 66 and beams 18A and 18B, thereby better distributing loads therebetween during turning maneuvers and the like.

In the embodiment shown, stops 66 are formed as part of hitch assembly 14. It is to be understood, however, that the stops for limiting pivotal movement of cutter heads 16A and 16B relative to hitch assembly 14 may be formed on hitch assembly 14 and/or beams 18A and 18B.

During use, cutter heads 16A and 16B are unfolded to the working position shown in FIG. 1 using hydraulic cylinder 46. By attaching cutter heads 16A and 16B at the upper portion of arched hitch assembly 14 and positioning cutter heads 16A and 16B generally in line with each other when in the working position, cutter heads 16A and 16B are able to be placed closer to traction unit 12 during use. Hydraulic cylinder 26 may be extended or retracted to adjust the tilt of cutter heads 16A and 16B. Lift arms 24 of traction unit 12 are positioned such that cutter heads 16A and 16B are at a desired distance above the ground. Power shaft 42 is engaged, which in turn drives gearbox 38, power shafts 40, and cutterbars 32. Cutter heads 16A and 16B are moved across the field in working direction 48 using traction unit 12. The vegetative matter is cut by cutterbars 32, conditioned by the conditioner for better drying, and discharged from forming shields 58 for forming wide swaths generally directly behind the cutter heads when accelerated drying is desired, or selectively for forming swaths centered toward the distal ends of the respective cutter head 16A and 16B, when it is desired to pick up adjacent swaths in one pass with a conventional pick-up head of a further crop processing machine such as a forage harvester or baler.

Figure 7:
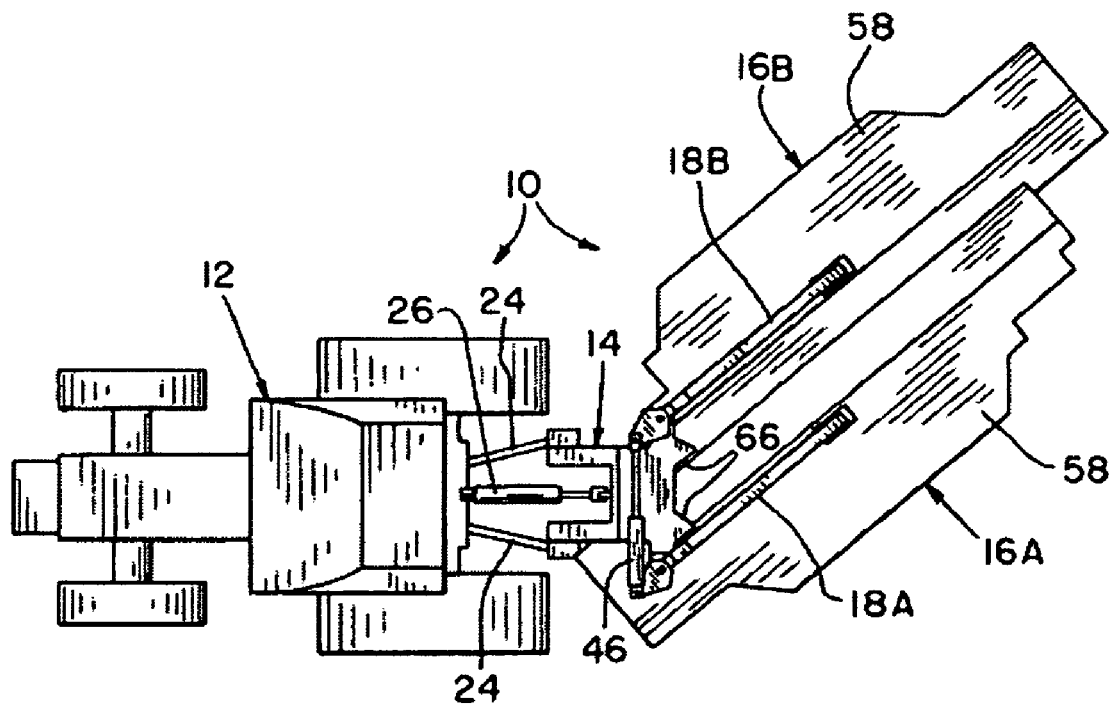
FIG. 7 is a top view of the mower shown in FIGS. 1–3, with the cutter heads in a transport position and pivoted relative to the hitch assembly.

To prepare for transport, beams 18A and 18B are pivoted to the transport position shown in FIGS. 3, 7 and 8 by extending the ram within hydraulic cylinder 46. The axial stroke length of hydraulic cylinder 46 may be set such that beams 18A and 18B are generally parallel with each other when the ram of hydraulic cylinder 46 is in the extended position. Transport wheels 56 are either attached to or lowered from a corresponding cutter head to support the distal ends thereof.

During transport, hydraulic cylinder 46 maintains cutter heads 16A and 16B in a generally parallel relationship with each other, while at the same time allowing cutter heads 16A and 16B to shift in a longitudinal direction relative to each other during turning-maneuvers or the like (FIG. 7). Hydraulic cylinder 26 defining the top link of the 3-point hitch attachment is placed in the float mode allowing the ram thereof to extend and retract freely. Thus, as traction unit 12 and cutter heads 16A and 16B traverse over uneven ground, 3-point hitch assembly 14 is supported by lower lift arms 24 but free to pivot relative to traction unit 12 (compare FIGS. 3 and 8).

The extent to which cutter heads 16A and 16B may pivot relative to hitch assembly 14 is limited by stops 66.

Having described the preferred embodiment, it will become apparent that various modifications can be made without departing from the scope of the invention as defined in the accompanying claims.

What is claimed is:

1. A mower, comprising:
   a 3-point hitch assembly including two lower lift arms and a length adjustable top link which can be selectively placed in fixed and float modes;
   first and second cutter heads, each said cutter head including an elongate cutterbar including a plurality of side-by-side mounted cutting modules and at least one transport wheel; and
   first and second cantilever beams respectively having one end pivotally connected for swinging horizontally about first and second locations at opposite sides of said hitch assembly, and respectively having a second end pivotally connected to said first and second cutter heads.

2. The mower of claim 1, further comprising a traction unit, said two lower lift arms and said top link being coupled with said traction unit.

3. The mower of claim 1, wherein said top link comprises a hydraulic cylinder.

4. The mower of claim 1, wherein said first and second cutter heads each have a proximal end and a distal end relative to said hitch assembly, said first and second cantilever beams being respectively pivotally connected to said first and second cutter heads approximately midway between said proximal end and said distal end.

5. The mower of claim 1, wherein said first and second cutter heads each have a distal end away from said 3-point hitch assembly, and wherein each said transport wheel is positioned generally adjacent said distal end.

6. The mower of claim 1, wherein each said transport wheel is one of retractable and removable.

* * * * *